(12) United States Patent
Kanzaki et al.

(10) Patent No.: US 9,043,066 B2
(45) Date of Patent: May 26, 2015

(54) VEHICLE AND CONTROL METHOD OF VEHICLE

(75) Inventors: Takao Kanzaki, Miyoshi (JP); Eiji Kitano, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/116,274

(22) PCT Filed: May 31, 2011

(86) PCT No.: PCT/JP2011/062458
§ 371 (c)(1),
(2), (4) Date: Nov. 7, 2013

(87) PCT Pub. No.: WO2012/164680
PCT Pub. Date: Dec. 6, 2012

(65) Prior Publication Data
US 2014/0095005 A1 Apr. 3, 2014

(51) Int. Cl.
*B60L 15/00* (2006.01)
*B60L 11/18* (2006.01)
*B60L 3/04* (2006.01)

(52) U.S. Cl.
CPC .............. *B60L 15/00* (2013.01); *B60L 11/1803* (2013.01); *B60L 15/007* (2013.01); *Y02T 10/7005* (2013.01); *B60L 3/04* (2013.01)

(58) Field of Classification Search
CPC ... B60L 11/1803; B60L 15/00; B60L 15/007; B60L 3/04; B60L 3/0007; Y02T 10/7005; Y02T 10/7022; Y02T 10/7044
USPC .................................. 701/22; 477/7; 307/10.1
See application file for complete search history.

(56) References Cited

U.S. PATENT DOCUMENTS 8,446,116 B2 * 5/2013 Fukuta et al. ............ 318/400.27
2011/0221370 A1 * 9/2011 Fukuta et al. ............ 318/400.27

FOREIGN PATENT DOCUMENTS

| JP | 2003348856 A | 12/2003 |
|----|--------------|---------|
| JP | 2005-20952 A | 1/2005 |
| JP | 2006-224772 A | 8/2006 |
| JP | 2009-268222 A | 11/2009 |
| JP | 2010093934 A | 4/2010 |
| JP | 2010-178595 A | 8/2010 |
| JP | 2010-233310 A | 10/2010 |
| JP | 2011-010406 A | 1/2011 |
| JP | 2011-036048 A | 2/2011 |
| JP | 2011-223705 A | 11/2011 |

* cited by examiner

*Primary Examiner* — John Q Nguyen
*Assistant Examiner* — Nadeem Odeh
(74) *Attorney, Agent, or Firm* — Sughrue Mion, PLLC

(57) ABSTRACT

A vehicle uses electric power from a mounted power storage device to drive a motor generator by a PCU to generate traction driving force. The vehicle can execute, as a function to discharge residual electric charge from a capacitor in PCU, MG discharging in which current is applied to the motor generator while preventing generation of torque for discharging, and PCU discharging through the conduction loss of switching elements in the PCU for discharging. In an event of detecting collision of the vehicle, an HV-ECU executes PCU discharging by priority, and executes MG discharging when the voltage of the capacitor is high.

8 Claims, 6 Drawing Sheets

VEHICLE AND CONTROL METHOD OF VEHICLE

CROSS REFERENCE TO RELATED APPLICATIONS

This application is a National Stage of International Application No. PCT/JP2011/062458, filed on May 31, 2011, the contents of all of which are incorporated herein by reference in their entirety.

TECHNICAL FIELD

The present invention relates to a vehicle and a control method of the vehicle, more particularly to the technique of discharging residual electric charge of a capacitor in a driving device in the event of vehicle collision.

BACKGROUND ART

As an environment-friendly vehicle in recent years, attention is focused on an electric powered vehicle that has a power storage device (for example, a secondary battery, capacitor or the like) mounted and that runs using the driving force generated from the electric power stored in the power storage device. Such an electric powered vehicle includes, for example, an electric vehicle, a hybrid vehicle, a fuel cell vehicle, and the like.

Such electric powered vehicles may have a motor generator incorporated for receiving electric power from the power storage device at the time of starting or at the time of acceleration to generate a driving force for running, and for generating power by the regenerative braking at the time of braking to store electrical energy in the power storage device. In order to control the motor generator according to the running state, the electric powered vehicle is mounted with a power conversion device converting electric power by a converter, inverter, or the like.

The power conversion device includes a smoothing capacitor of a large capacitance for stabilizing the supplied DC power. During operation of the power conversion device, charge corresponding to the applied voltage is stored at the smoothing capacitor.

The charge stored at the smoothing capacitor must be discharged promptly when collision of the vehicle occurs.

Japanese Patent Laying-Open No. 2005-020952 (PTD 1) discloses a configuration of a vehicle with an electric motor as one driving source, wherein an IGBT (Insulated Gate Bipolar Transistor) in an inverter circuit is switching-controlled so as to prevent generation of torque at the electric motor by an HV-ECU, when collision of the vehicle is expected during vehicle running, to discharge the charge from the capacitor in the inverter.

CITATION LIST

Patent Document

PTD 1: Japanese Patent Laying-Open No. 2005-020952
PTD 2: Japanese Patent Laying-Open No. 2010-178595
PTD 3: Japanese Patent Laying-Open No. 2009-268222
PTD 4: Japanese Patent Laying-Open No. 2010-233310

SUMMARY OF INVENTION

Technical Problem

According to the technique disclosed in Japanese Patent Laying-Open No. 2005-020952 (PTD 1), the charge stored in the capacitor of the inverter is consumed by the electric motor, so that the effect of the electric power of high voltage stored in the capacitor to the surrounding, when vehicle collision is expected, can be eliminated.

However, according to Japanese Patent Laying-Open No. 2005-020952 (PTD 1), a command to drive the IGBT in the inverter is required from a control device. In the case where communication from the control device to the inverter is disabled or when the power supplied to the control device is disconnected in the event of collision, a driving command of the IGBT cannot be issued. There is a possibility that the residual electric charge in the capacitor cannot be discharged appropriately.

Further, there is the case where the scheme of discharging the residual electric charge from the capacitor by the electric power consumed through the conduction loss of the IGBT may be employed when collision occurs. However, in such a case, the voltage that can be discharged, the element temperature of the IGBT and the like must be restricted in order to prevent damage to the IGBT due to heat. Accordingly, discharging may be time-consuming, and/or a discharging operation may be disallowed by the restriction.

In view of the foregoing, an object of the present invention is to discharge, at a vehicle including a driving device with a capacitor, residual electric charge stored in the capacitor reliably in a short period of time, in the event of collision.

Solution to Problem

A vehicle according to the present invention can generate traction driving force using electric power from a power storage device mounted thereon. The vehicle includes a load device, a driving device configured to convert the electric power from the power storage device to drive the load device, a first control device configured to control the driving device, and a collision detection unit configured to detect collision of the vehicle. The driving device includes an inverter, a capacitor connected to a direct current side terminal of the inverter, a second control device, and a discharge circuit. The inverter includes switching elements, and converts DC power from the power storage device into AC power to drive the load device. The second control device is capable of transmitting and receiving a signal to and from the first control device, and controls the switching elements of the inverter based on a command from the first control device. The discharge circuit carries out a first discharging operation causing residual electric charge in the capacitor to be consumed within the driving device based on a command from the second control device value in an event of detecting collision of the vehicle by the collision detection unit. The first control device provides to the second control device a command to cause the second control device to execute a second discharging operation causing current to be applied to the load device for discharging residual electric charge from the capacitor when the voltage of the capacitor exceeds a predetermined threshold value in the event of detecting collision of the vehicle by the collision detection unit.

Preferably, the first control device provides to the second control device the command to cause the second control device to execute the second discharging operation when the voltage of the capacitor exceeds the predetermined threshold value at an elapse of a predetermined period from starting the first discharging operation by the discharge circuit.

Preferably, the second control device causes the discharge circuit to execute the first discharging operation in the event of communication error with the first control device.

Preferably, the vehicle further includes a battery configured to supply power supply voltage to the first and second control devices. The discharge circuit executes the first discharging operation regardless of whether there is a command from the second control device, when the power supply voltage from the battery is lower than a predetermined reference voltage.

Preferably, the discharge circuit executes the first discharging operation by setting one of two switching elements in a bridge circuit of at least one phase in the inverter at a conducting state, and switching the other switching element between a conducting and non-conducting state while reducing a control terminal voltage of the other switching element.

Preferably, the driving device further includes a discharge unit coupled parallel to the capacitor. The discharge unit includes a resistor and a switch connected in series. The discharge circuit executes the first discharging operation by setting the switch at a conducting state.

Preferably, the load device is a rotating electric machine coupled to a driving wheel of the vehicle for generating the traction driving force.

A control method of a vehicle according to the present invention is for a vehicle capable of generating traction driving force using electric power from a mounted power storage device. The vehicle includes a load device, a driving device configured to convert electric power from the power storage device to drive the load device, and a collision detection unit configured to detect collision of the vehicle. The driving device includes an inverter having switching elements, and configured to convert DC power from the power storage device into AC power to drive the load device, a capacitor connected to a direct current side terminal of the inverter, and a discharge circuit for performing a first discharging operation causing residual electric charge of the capacitor to be consumed within the driving device. The control method includes the steps of: carrying out a first discharging operation by the discharge circuit in an event of detecting collision of the vehicle by the collision detection unit; and controlling the inverter such that a second discharging operation causing current to be applied to the load device to discharge the residual electric charge from the capacitor is executed when the voltage of the capacitor exceeds a predetermined threshold value in an event of detecting collision of the vehicle by the collision detection unit.

Advantageous Effects of Invention

At a vehicle including a driving device having a capacitor in the present invention, residual electric charge stored in the capacitor can be discharged reliably in a short period of time in the event of collision.

DESCRIPTION OF EMBODIMENTS

Figure 1:
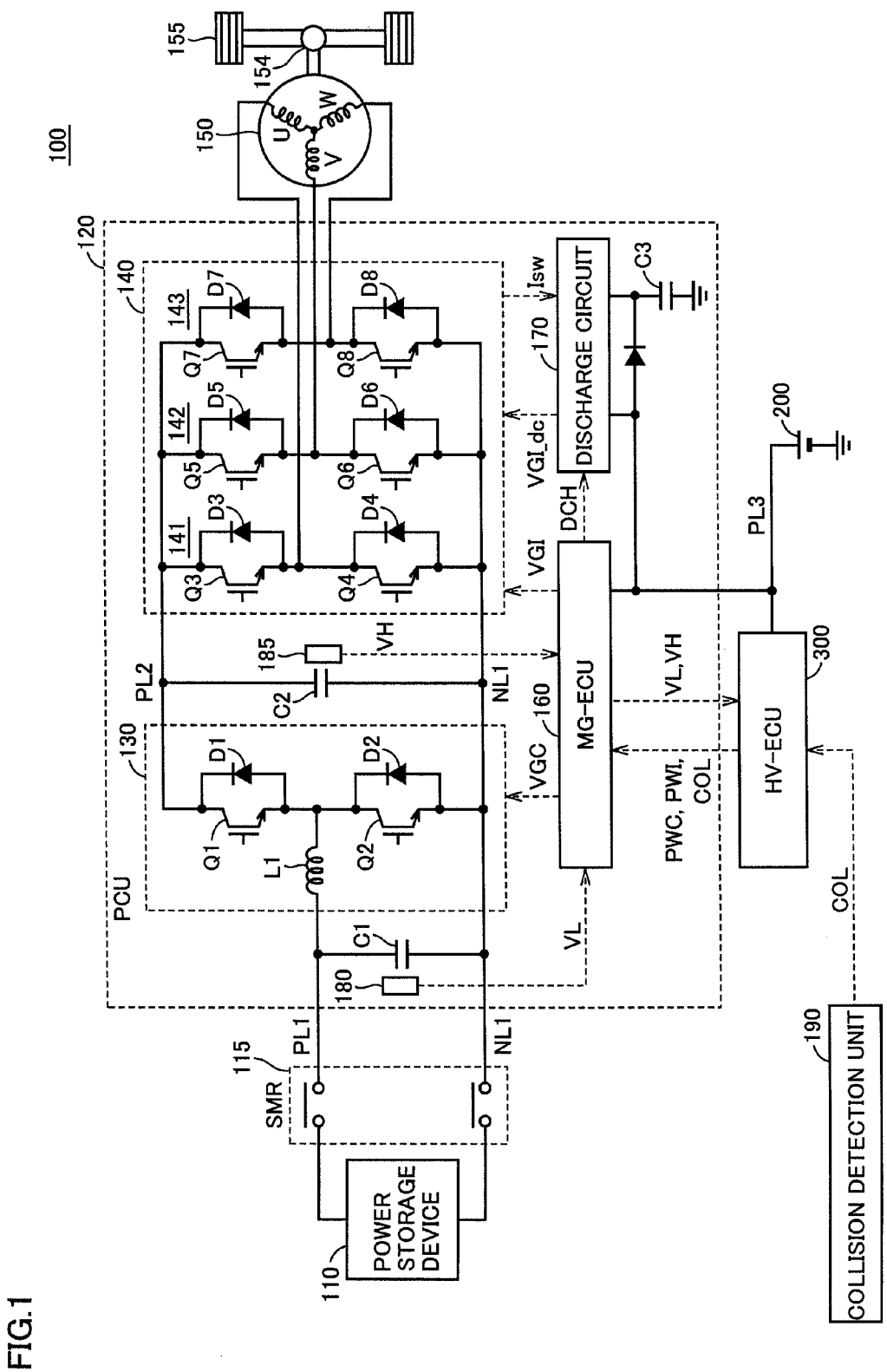
FIG. 1 is an entire block diagram of a vehicle according to an embodiment.

Embodiments of the present invention will be described in detail hereinafter with reference to the drawings. In the drawings, the same or corresponding elements have the same reference characters allotted, and description thereof will not be repeated.

FIG. 1 is an entire block diagram of a vehicle 100 according to the present embodiment. Although the present embodiment will be described based on an electric vehicle as an example of vehicle 100, the configuration of vehicle 100 is not limited thereto, and is applicable to any vehicle that can run by electric power from a power storage device. For example, a hybrid vehicle or a fuel cell vehicle can be cited as vehicle 100, besides an electric vehicle.

Referring to FIG. 1, electric vehicle 100 includes a power storage device 110, a system main relay (SMR) 115, a power control unit (PCU) 120 that is a driving device, a motor generator 150, a power transmission gear 154, a driving wheel 155, a collision detection unit 190, an auxiliary battery 200, and an HV-ECU (Electronic Control Unit) 300 that is a control device.

PCU 120 includes a converter 130, an inverter 140, an MG-ECU 160, a discharge circuit 170, and capacitors C1-C3. All the devices in PCU 120 are generally stored in the same casing, and coupled to another device outside PCU 120 by a cable, a bus bar, or the like.

Power storage device 110 is an electric power reservoir element configured to allow charging and discharging. Power storage device 110 is configured including a secondary battery such as a lithium ion battery, nickel-metal hydride battery, or lead battery, or a power storage element such as an electric double layer capacitor.

Power storage device 110 is connected to converter 130 via a power line PL1 and a ground line NL1. Power storage device 110 stores electric power generated at motor generator 150. Power storage device 110 provides an output of approximately 200V, for example.

The relays in SMR 115 are inserted at power line PL1 and ground line NL1 connecting power storage device 110 and converter 130. SMR 115 is under control of a control signal SE1 from HV-ECU 300 to switch between supplying and cutting the electric power between power storage device 110 and converter 130.

Capacitor C1 is connected between power line PL1 and ground line NL1. Capacitor C1 reduces the voltage variation between power line PL1 and ground line NL1. A voltage sensor 180 detects the voltage across capacitor C1 to provide a detected value VL thereof to HV-ECU 300 via MG-ECU 160.

Converter 130 includes switching elements Q1 and Q2, diodes D1 and D2, and a reactor L1.

Switching elements Q1 and Q2 are connected in series between power line PL2 and ground line NL1 with the direction from power line PL2 towards ground line NL1 as the forward direction. Although an IGBT will be taken as an example as a switching element in the present embodiment, a power MOS (Metal Oxide Semiconductor) transistor or a power bipolar transistor may be employed as alternative examples.

Antiparallel diodes D1 and D2 are connected to switching elements Q1 and Q2, respectively. Reactor L1 is provided between the connection node of switching elements Q1 and Q2 and power line PL1. In other words, converter 130 constitutes a chopper circuit.

Switching elements Q1 and Q2 are controlled by a gate signal VGC generated by MG-ECU 160 based on control signal PWC from HV-ECU 300, and performs a voltage conversion operation between power line PL1 and ground line NL1, and power line PL2 and ground line NL1.

Converter 130 is controlled such that switching elements Q1 and Q2 are turned on and off alternately and in a complementary manner within each switching period. Converter 130 boosts the DC voltage from power storage device 110 during a boosting operation. This boosting operation is conducted by supplying the electromagnetic energy stored at reactor L1 during the ON period of switching element Q2 onto power line PL2 via switching element Q1 and antiparallel diode D1.

Converter 130 steps down the DC voltage from the load device during a step-down operation. This step-down operation is conducted by supplying the electromagnetic energy stored at reactor L1 during the ON period of switching elements Q1 to ground line NL1 via switching element Q2 and antiparallel diode D2.

The voltage conversion ratio in such boosting operation and step-down operation is controlled by the ON period ratio (duty ratio) of switching elements Q1 and Q2 in the aforementioned switching period. In the case where a boosting operation and step-down operation are not required, the voltage conversion ratio can be set at 1.0 (duty ratio=100%) by setting control signal PWC such that switching elements Q1 and Q2 are fixed at an ON and OFF state, respectively.

Capacitor C2 is connected between power line PL2 and ground line NL1 connecting converter 130 and inverter 140. Capacitor C2 reduces the voltage variation between power line PL2 and ground line NL1. Voltage sensor 185 detects the voltage across capacitor C2, and provides a detected value VH thereof to HV-ECU 300 via MG-ECU 160.

Inverter 140 is connected to converter 130 via power line PL2 and ground line NL1. Inverter 140 is controlled by a gate signal VGI generated by MG-ECU 160 based on a control command PWI from HV-ECU 300 to convert DC power output from converter 130 into AC power for driving motor generator 150.

Inverter 140 includes a U-phase arm 141, a V-phase arm 142, and a W-phase arm 143, constituting a bridge circuit. U-phase arm 141, V-phase arm 142 and W-phase arm 143 are connected in parallel between power line PL2 and ground line NL1.

U-phase arm 141 includes switching elements Q3 and Q4 connected in series between power line PL2 and ground line NL1, and diodes D3 and D4 connected parallel to switching elements Q3 and Q4, respectively. Diode D3 has its cathode and its anode connected to the collector and emitter, respectively, of switching element Q3. Diode D4 has its cathode and its anode connected to the collector and emitter, respectively, of switching element Q4.

V-phase arm 142 includes switching elements Q5 and Q6 connected in series between power line PL2 and ground line NL1, and diodes D5 and D6 connected parallel to switching elements Q5 and Q6, respectively. Diode D5 has its cathode and anode connected to the collector and emitter, respectively, of switching element Q5. Diode D6 has its cathode and its anode connected to the collector and emitter, respectively, of switching element Q6.

W-phase arm 143 includes switching elements Q7 and Q8 connected in series between power line PL2 and ground line NL1, and diodes D7 and D8 connected parallel to switching elements Q7 and Q8, respectively. Diode D7 has its cathode and its anode connected to the collector and emitter, respectively, of switching element Q7. Diode D8 has its cathode and its anode connected to the collector and emitter, respectively, of switching element Q8.

Motor generator 150 is a 3-phase AC motor generator including a rotor in which a permanent magnet is embedded and a stator having a 3-phase coil arranged in a Y-connection at the neutral point. The three coils of the U, V, and W phase each have one end connected in common to the neutral point. The U-phase coil has the other end connected to the connection node of switching elements Q3 and Q4. The V-phase coil has the other end connected to the connection node of switching elements Q5 and Q6. The W-phase coil has the other end connected to the connection node of switching elements Q7 and Q8.

The output torque of motor generator 150 is transmitted to driving wheel 155 via a power transmission gear 154 configured including a speed reducer and a power split mechanism to cause vehicle 100 to run. Motor generator 150 can generate electric power by the rotative force of driving wheel 155 during a regenerative braking operation of vehicle 100. The generated electric power is converted into the charging electric power for power storage device 110 by inverter 140.

Collision detection unit 190 includes a sensor (for example, a G sensor) not shown to detect whether vehicle 100 has collided or not. A detection signal COL thereof is output to HV-ECU 300.

MG-ECU 160 receives control signals PWC and PWI from HV-ECU 300, as set forth above. Based on these signals, MG-ECU 160 generates and provides to converter 130 and inverter 140 gate signals VGC and VGI to drive each switching element in converter 130 and inverter 140.

MG-ECU 160 also receives a collision signal COL of vehicle 100 from HV-ECU 300. In response to receiving collision signal COL, MG-ECU 160 outputs a discharge signal DCH to discharge circuit 170 for executing a discharging operation to discharge the residual electric charge stored in capacitor C2 within PCU 120 (hereinafter, also referred to as "PCU discharging").

As will be described afterwards with reference to FIG. 6, MG-ECU 160 outputs a discharge signal DCH to discharge circuit 170 also in the case where communication error with HV-ECU 300 is detected.

Discharge circuit 170 functions to execute PCU discharging. In response to receiving discharge signal DCH from MG-ECU 160, discharge circuit 170 controls the switching elements in inverter 140, for example, to execute PCU discharging.

Auxiliary battery 200 is a voltage source for supplying power supply voltage to a device of low voltage system in vehicle 100 such as an auxiliary device not shown and a control device such as each ECU. Auxiliary battery 200 is typically constituted of a lead storage battery having an output voltage of approximately 12V, for example.

Auxiliary battery 200 delivers power supply voltage to HV-ECU 300, MG-ECU 160 and discharge circuit 170 via power line PL3. Auxiliary battery 200 is connected to capacitor C3 coupled to discharge circuit 170, via a diode.

Discharge circuit 170 can also operate by the electric power stored in capacitor C3. Therefore, even in the case where the power supply voltage from auxiliary battery 200 is disrupted, discharge circuit 170 can execute a discharging operation by the electric power stored in capacitor C3 for an arbitrary time. A configuration may be employed in which the electric power stored in capacitor C2 is stepped down and supplied to discharge circuit 170, instead of the supply of the power supply voltage from capacitor C3.

HV-ECU 300 includes a CPU (Central Processing Unit), a storage device, and an input/output buffer, all not shown in FIG. 1, to input a signal from each sensor, output a control signal to each device, and to control vehicle 100 as well as each device. Control thereof is not restricted to processing by software, and processing by dedicated hardware (electronic circuit) is allowed.

Thus, when vehicle driving power is to be generated by the electric power from the power storage device, the output of the motor generator should also be relatively high. Accordingly, the capacitor connected to the power conversion device including an inverter, a converter, and the like to control the motor generator must be of high voltage and large capacitance. Therefore, in order to suppress the effect to the surrounding as low as possible when short-circuiting or grounding occurs in the event of a collision accident of vehicle, the residual electric charge in the capacitor must be discharged as fast as possible.

Figure 2:
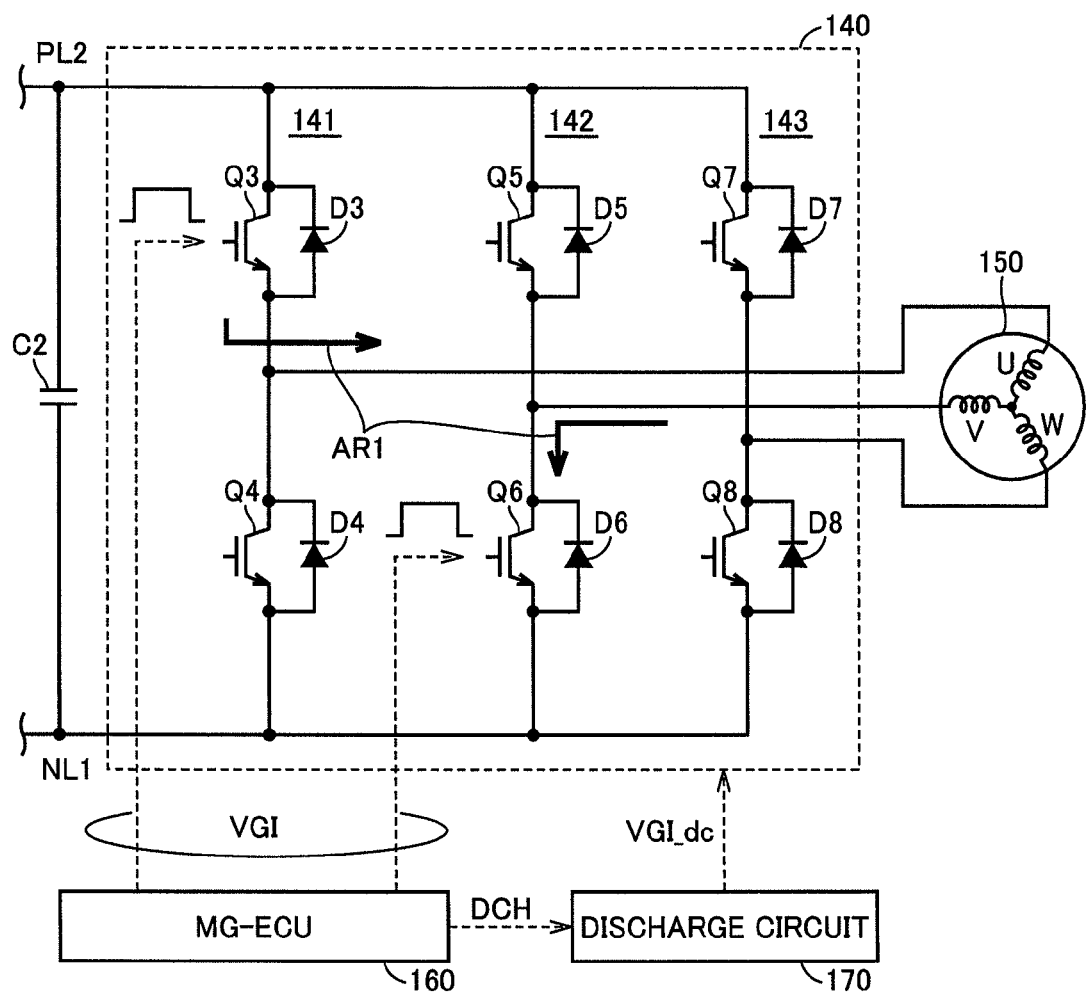
FIG. 2 is a diagram to describe discharging of a capacitor by means of a motor generator.

One method of discharging the residual electric charge in a capacitor includes discharging by conducting a current flow while preventing torque generation at the motor generator (hereinafter, also referred to as "MG discharging"), as shown in FIG. 2. Such a discharging operation is also executed at the ending process when a running end operation of the vehicle is performed by the user.

For example, as shown in FIG. 2, switching elements Q3 and Q6 in inverter 140 are ON-controlled by MG-ECU 160, whereby current flows as indicated by arrow AR1. The residual electric charge in capacitor C2 is consumed by the U-phase coil and V-phase coil of motor generator 150, corresponding to discharging. The driving pattern of the switching elements is not limited to that set forth above, and may take another pattern. Alternatively, the driving pattern may be switched for every predetermined time.

Such MG discharging is advantageous in that discharging can be conducted in a short time since consumed power is great and the heat-resistant temperature is high. However, since this operation is driven based on control signal PWC from HV-ECU 300, there is a disadvantage that the discharging operation cannot be conducted if the signal path between HV-ECU 300 and PCU 120 is cut by the collision of vehicle 100, for example. Moreover, the power line connecting inverter 140 and motor generator 150 must be sound.

PCU discharging executing a discharging operation using only the devices in PCU 120 may be carried out, even if there is no command from HV-ECU 300. Since the devices in PCU 120 are often stored in one casing as mentioned above, the signal transmission path and power transmission path in PCU 120 are not easily damaged even in the case where collision occurs. Therefore, PCU discharging not using a device external to PCU 120 will not be affected by the damage status of the vehicle at the time of collision, allowing the operation to be executed in a relatively reliable manner. This PCU discharging is executed by discharge circuit 170.

Figure 3:
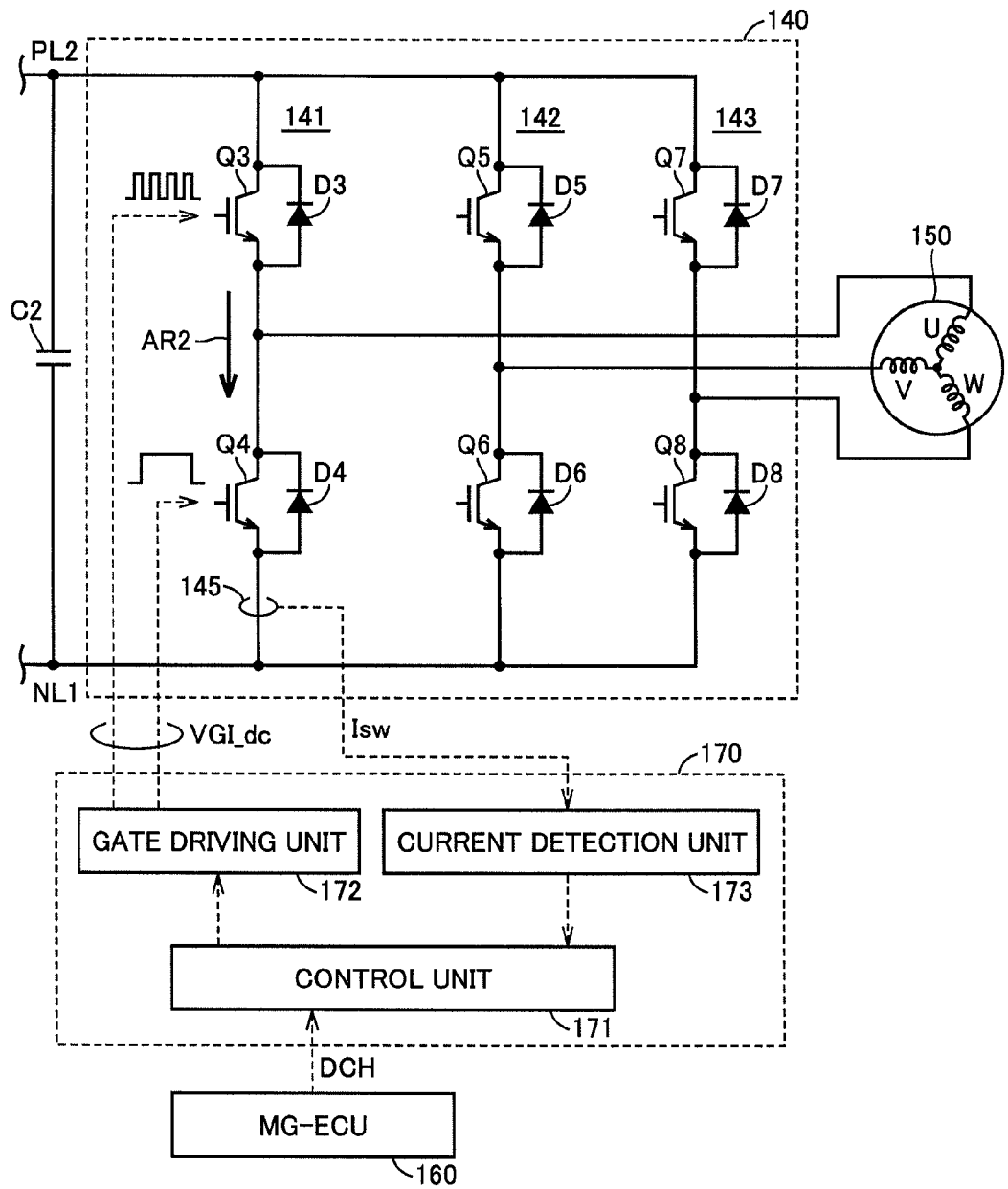
FIG. 3 is a diagram to describe an example of PCU discharging.
Figure 4:
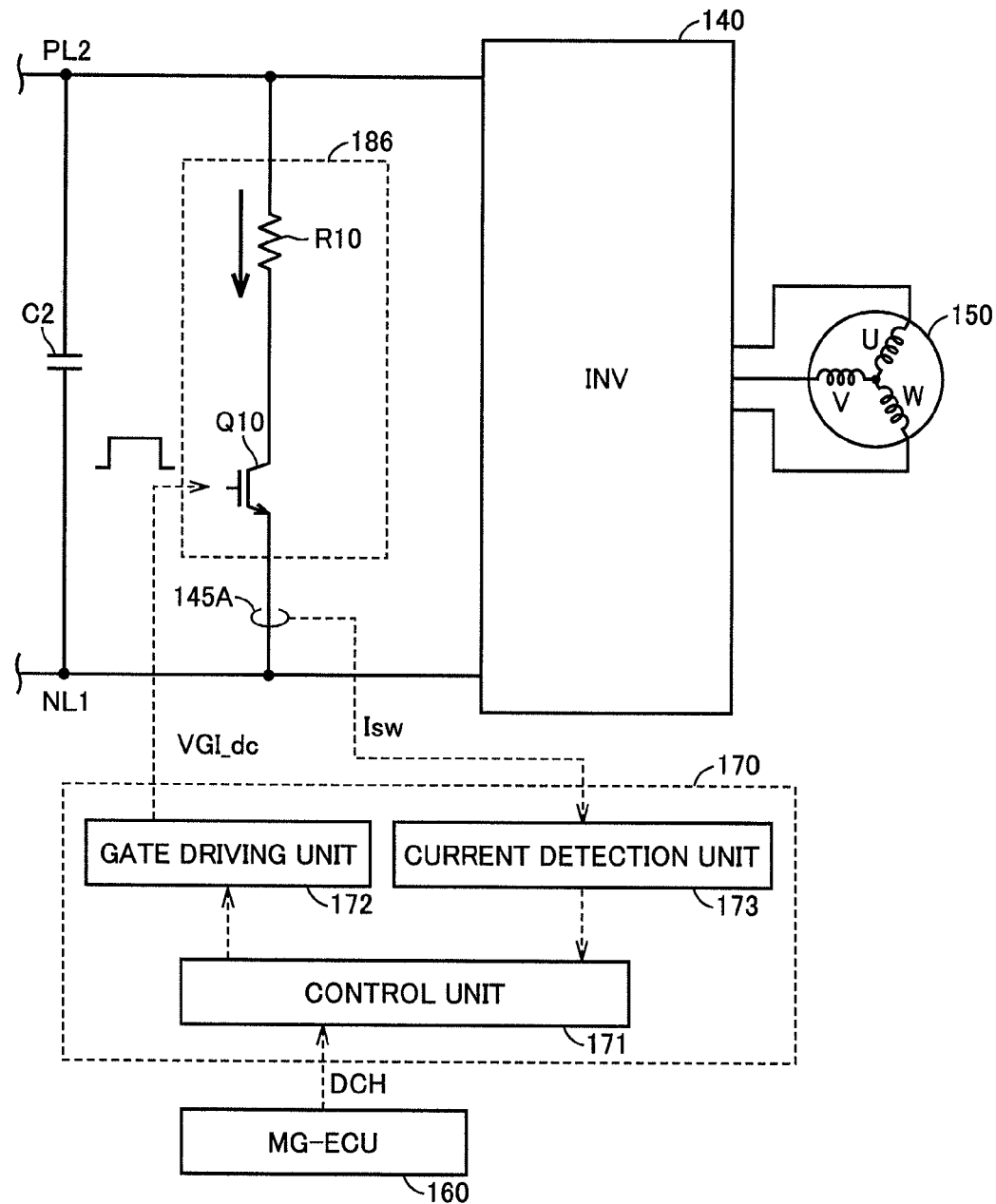
FIG. 4 is a diagram to describe another example of PCU discharging.

FIG. 3 represents an example of a specific configuration of PCU discharging. Although the case where discharging is conducted with the switching elements in inverter 140 will be described with reference to FIG. 3, the switching elements in converter 130 may also be employed.

Referring to FIG. 3, discharge circuit 170 includes a control unit 171, a gate driving unit 172, and a current detection unit 173. The functions of control unit 171, gate driving unit 172, and current detection unit 173 may be established by software. However, establishing by hardware is more preferable to allow the operation to be performed reliably even at the time of emergency such as when collision occurs.

Control unit 171 receives a discharge signal DCH from MG-ECU 160. Upon receiving discharge signal DCH, control unit 171 outputs to gate driving unit 172 a command to cause the switching elements to operate in a manner as set forth below.

Gate driving unit 172 applies a gate voltage of the saturation region to switching element Q4, i.e. the lower arm in U-phase arm 141, for example, to render switching element Q4 conductive under a low resistance state. Then, gate driving unit 172 applies the gate voltage of the non-saturation region intermittently to switching element Q3, i.e. the upper arm of U-phase arm 141. By driving switching elements Q3 and Q4 through such a gate signal VGI_dc, current flows as indicated by arrow AR2 in FIG. 3.

The driving of switching element Q3 at the non-saturation region here increases the conduction resistance of switching element Q3, so that the short-circuit current between power line PL2 and ground line NL1 is restricted, and the charge in capacitor C2 can be discharged by the conduction loss at switching element Q3.

Current detection unit 173 detects from a current sensor 145 provided at each arm a current Isw flowing through each arm. Control unit 171 appropriately adjusts the gate voltage and/or driving duty of switching element Q3, as necessary, based on current value Isw detected at current detection unit 173.

By driving the switching elements in inverter 140 as described above through discharge circuit 170, the charge in capacitor C2 can be discharged within PCU 120 even in the case where the electric power transmission path between inverter 140 and motor generator 150, for example, is cut off.

It is to be noted that such discharging by the conduction loss of a switching element involves heat generation at the switching element. Therefore, depending upon the state of the coolant for cooling PCU 120 and the amount of residual electric charge in capacitor C2, the discharging current and/or conducting time may be restricted to prevent damage of the switching element. Thus, there is a disadvantage that discharging may be time consuming or sufficient discharging cannot be conducted.

The above description is based on the case where discharging is conducted using U-phase arm 141 alone. Alternative to and/or in addition to the discharging set forth above, the remaining V-phase arm 142 and W-phase arm 143 may be employed for discharging at the same time, or in a switching manner. Accordingly, the load on each switching element during PCU discharging can be alleviated.

Furthermore, a configuration may be employed in which a dedicated discharge unit 186 is provided, including a resistor R10 and a switching element Q10 connected in series between power line PL2 and ground line NL1. Although additional components are required in such a case, there is an advantage that more charge can be discharged in a short period of time since the restriction by the generated heat of switching element can be alleviated.

In the present embodiment, the advantages of MG discharging and PCU discharging are utilized and the disadvantages thereof are compensated for to execute discharging control, allowing the residual electric charge to be discharged from the capacitor more reliably in the event of vehicle collision.

Figure 5:
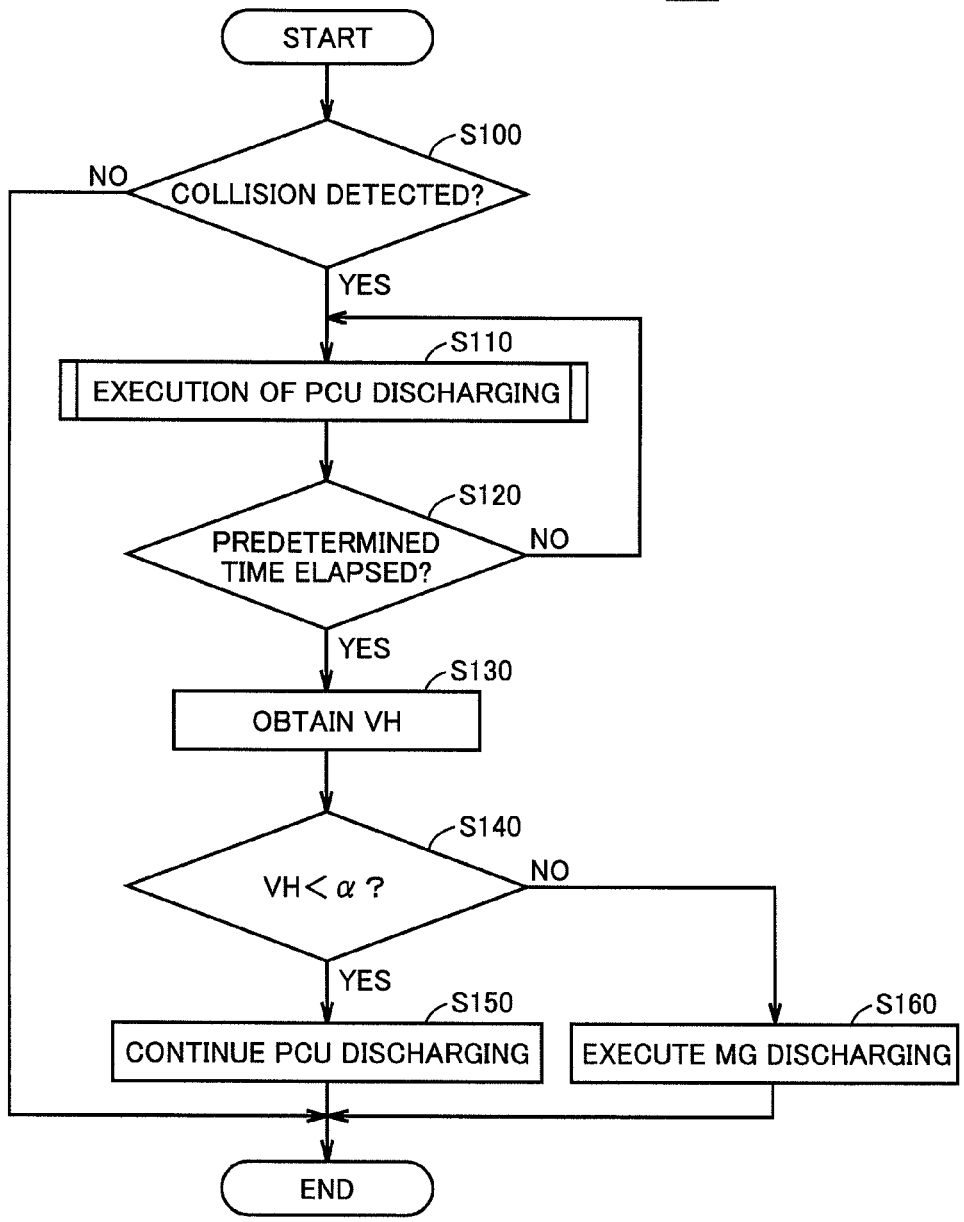
FIG. 5 is a flowchart to describe in detail a discharge control process executed at an HV-ECU in the present embodiment.

FIG. 5 is a flowchart to describe in detail a discharge control process executed at HV-ECU 300 in the present embodiment. The flowchart of FIG. 5 is implemented by executing a program prestored in HV-ECU 300 at a predetermined cycle. Alternatively, dedicated hardware (electronic circuit) may be established for some of the steps to implement the process.

Referring to FIGS. 1 and 5, HV-ECU 300 determines whether or not collision has been detected based on collision signal COL from collision detection unit 190 at step (hereinafter, step abbreviated at S) 100.

When collision has not been detected (NO at S100), HV-ECU 300 ends the process since discharging of capacitor C2 is not required.

When collision has been detected (YES at S100), control proceeds to S110 where HV-ECU 300 causes MG-ECU 160 to execute PCU discharging by priority. This is because PCU discharging is relatively less affected by the vehicle damaged state caused by collision, as mentioned above.

Then, HV-ECU 300 determines whether a predetermined time has elapsed from starting PCU discharging.

When the predetermined time has not elapsed (NO at S120), control returns to S110 to continue PCU discharging.

When the predetermined time has elapsed (YES at S120), control proceeds to S130 where HV-ECU 300 obtains voltage VH of capacitor C2 to determine whether voltage VH is lower than a predetermined threshold value α (S140). In other words, HV-ECU 300 determines whether the residual electric charge in capacitor C2 can be discharged by the PCU discharging operation before ending the discharging operation required by the safety standards, safety criterion, and the like.

When voltage VH is lower than threshold value α (YES at S140), HV-ECU 300 determines that discharging of the residual electric charge can be achieved by PCU discharging, and shifts the process to S150 to continue PCU discharging until the residual electric charge in capacitor C2 is reduced to a predetermined level. When voltage VH of capacitor C2 becomes lower than voltage VL of capacitor C1, the residual electric charge in capacitor C1 moves to capacitor C2 via diode D1 of converter 130. As a result, the residual electric charge in capacitor C1 is also discharged. Since PCU discharging is already currently executed at S110, the selection of YES at S140 causes continuation of the PCU discharging operation. In other words, S150 in FIG. 5 is only for confirmation, and is dispensable.

When voltage VH is greater than or equal to threshold value α (NO at S140), HV-ECU 300 determines that there is so much residual electric charge in capacitor C2 that discharging may not be completed within the period of time before ending the requested discharging operation by just the PCU discharging operation. Accordingly, control proceeds to S160 where HV-ECU 300 executes MG discharging instead of or in addition to PCU discharging to discharge the residual electric charge from capacitor C2 in a short period of time.

Thus, by appropriately employing PCU discharging and MG discharging according to voltage VH in the discharging operation of the residual electric charge from the capacitor in the event of vehicle collision, discharging of the residual electric charge can be performed more reliably and possibly in a shorter period of time.

It is to be noted that the control described with reference to FIG. 5 basically cannot be executed unless proper communication between HV-ECU 300 and PCU 120 is established since a control signal from HV-ECU 300 is required for the discharging operation, as described above.

Therefore, when the communication of MG-ECU 160 in PCU 120 with HV-ECU 300 is in error, PCU discharging is executed to discharge the residual electric charge from capacitor C2.

Figure 6:
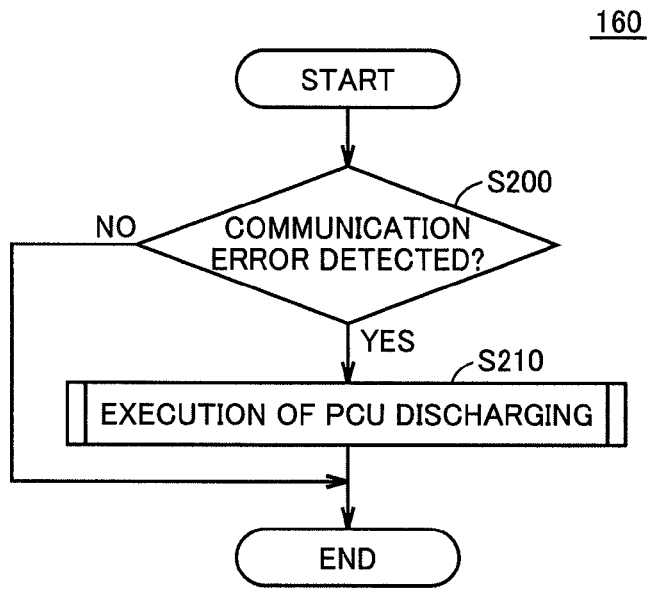
FIG. 6 is a flowchart to describe a discharge control process executed at a MG-ECU when communication error occurs between the HV-ECU and MG-ECU.

FIG. 6 is a flowchart to describe a discharge control process executed at MG-ECU 160 when communication error occurs between HV-ECU 300 and MG-ECU 160.

At S200 in FIG. 6, MG-ECU 160 determines whether communication error with HV-ECU 300 has occurred or not.

When occurrence of communication error with HV-ECU 300 is detected (YES at S200), control proceeds to S210 where MG-ECU 160 executes PCU discharging by means of discharge circuit 170.

In contrast, when communication error with HV-ECU 300 has not occurred (NO at S200), the process ends.

When there is an error in the communication with HV-ECU 300, MG-ECU 160 executes the present control regardless of whether vehicle collision has occurred or not since vehicle collision signal COL cannot be received.

In the case where the feeding of the power supply voltage from auxiliary battery 200 to PCU 120 is cut off by the collision, MG-ECU 160 may not be able to operate. In this case, a discharge signal DCH cannot be output from MG-ECU 160 to discharge circuit 170.

Thus, discharge circuit 170 receives power supply voltage from the backup power supply circuit such as capacitor C3 shown in FIG. 1, in addition to the power supply voltage supplied from auxiliary battery 200. Therefore, control unit 171 of discharge circuit 170 determines that MG-ECU 160 cannot operate when the power supply voltage from auxiliary battery 200 is reduced, and executes PCU discharging on its own to discharge residual electric charge from capacitor C2.

Figure 7:
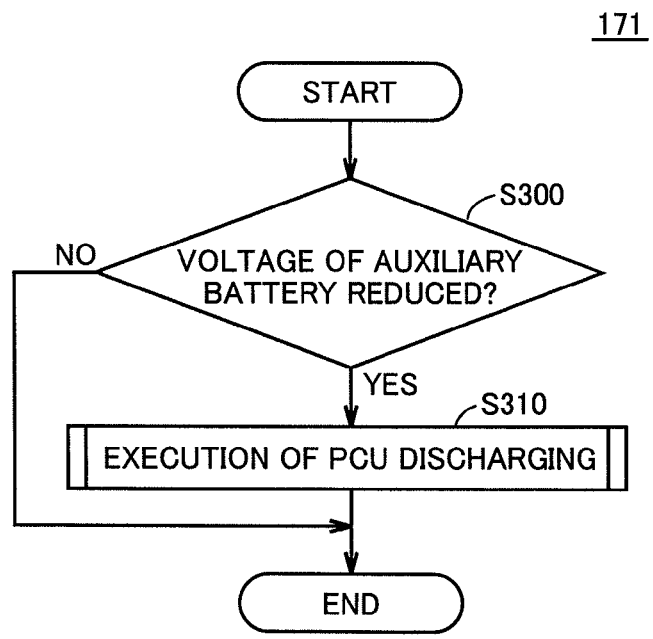
FIG. 7 is a flowchart to describe a discharge control process executed at the discharge circuit when voltage in an auxiliary battery becomes low.

FIG. 7 is a flowchart to describe a discharge control process executed at control unit 171 in discharge circuit 170 when voltage reduction of auxiliary battery 200 occurs.

Referring to FIGS. 1 and 7, control unit 171 in discharge circuit 170 determines whether the voltage of auxiliary battery 200 is reduced down as low as a predetermined level at S300.

When the voltage of auxiliary battery 200 is reduced (YES at S300), control proceeds to S310 where control unit 171 executes a PCU discharging operation on its own to discharge the residual electric charge from capacitor C2.

In the case where the voltage of auxiliary battery 200 is not reduced (NO at S300), control unit 171 ends the process.

The present control is executed independent of whether or not vehicle collision has occurred since a collision signal COL cannot be received from HV-ECU 300 when the voltage of auxiliary battery 200 is reduced.

Thus, by establishing a configuration allowing execution of both MG discharging and PCU discharging, and executing control according to the above-described processing, a residual electric charge discharging operation that is highly robust, and that can accommodate various states of the vehicle in the event of vehicle collision, can be performed.

It should be understood that the embodiments disclosed herein are illustrative and non-restrictive in every respect. The scope of the present invention is defined by the terms of the claims, rather than the description set forth above, and is intended to include any modifications within the scope and meaning equivalent to the terms of the claims.

REFERENCE SIGNS LIST 100 vehicle; 110 power storage device; 115 SMR; 120 PCU; 130 converter; 140 inverter; 141 U-phase arm; 142 V-phase arm; 143 W-phase arm; 145, 145A current sensor; 150 motor generator; 154 power transmission gear; 155 driving wheel; 160 MG-ECU; 170 discharge circuit; 171 control unit; 172 gate driving unit; 173 current detection unit; 180, 185 voltage sensor; 186 discharge unit; 190 collision detection unit; 200 auxiliary battery; 300 HV-ECU; C1-C3 capacitor; D1-D8 diode; L1 reactor; NL1 ground line; PL1-PL3 power line; Q1-Q8, Q10 switching element; R10 resistor.

The invention claimed is:

1. A vehicle capable of generating traction driving force using electric power from a power storage device mounted on the vehicle, the vehicle comprising:
   a load device,
   a driving device configured to convert the electric power from the power storage device to drive the load device,
   a first control device configured to control the driving device, and
   a collision detection unit configured to detect collision of the vehicle,
   the driving device including
   an inverter having switching elements, and configured to convert DC power from the power storage device into AC power to drive the load device,
   a capacitor connected to a direct current side terminal of the inverter,
   a second control device capable of transmitting and receiving a signal to and from the first control device, and configured to control the switching elements based on a command from the first control device, and
   a discharge circuit configured to carry out a first discharging operation causing residual electric charge in the capacitor to be consumed within the driving device based on a command from the second control device in an event of detecting collision of the vehicle by the collision detection unit,
   the first control device configured to provide to the second control device a command to cause the second control device to execute a second discharging operation causing current to be applied to the load device for discharging residual electric charge from the capacitor when a voltage of the capacitor exceeds a predetermined threshold value in the event of detecting collision of the vehicle by the collision detection unit.

2. The vehicle according to claim 1, wherein the first control device provides to the second control device the command to cause the second control device to execute the second discharging operation when the voltage of the capacitor exceeds the predetermined threshold value at an elapse of a predetermined time from starting the first discharging operation by the discharge circuit.

3. The vehicle according to claim 1, wherein the second control device causes the discharge circuit to execute the first discharging operation in an event of communication error with the first control device.

4. The vehicle according to claim 1, further comprising a battery configured to supply power supply voltage to the first and second control devices,
   wherein the discharge circuit executes the first discharging operation regardless of whether there is a command from the second control device, when the power supply voltage from the battery is lower than a predetermined reference voltage.

5. The vehicle according to claim 1, wherein the discharge circuit executes the first discharging operation by setting one of two switching elements in a bridge circuit of at least one phase of the inverter at a conducting state, and by switching the other switching element between a conducting state and non-conducting state while reducing a control terminal voltage of the other switching element.

6. The vehicle according to claim 1, wherein
   the driving device further includes a discharge unit coupled parallel to the capacitor,
   the discharge unit includes a resistor and a switch connected in series,
   the discharge circuit executes the first discharging operation by setting the switch at a conducting state.

7. The vehicle according to claim 1, wherein the load device is a rotating electric machine coupled to a driving wheel of the vehicle for generating the traction driving force.

8. A control method of a vehicle capable of generating traction driving force using electric power from a power storage device mounted on the vehicle,
   the vehicle including
   a load device,
   a driving device configured to convert electric power from the power storage device to drive the load device, and
   a collision detection unit configured to detect collision of the vehicle,
   the driving device including
   an inverter having switching elements, and configured to convert DC power from the power storage device into AC power to drive the load device,
   a capacitor connected to a direct current side terminal of the inverter, and
   a discharge circuit configured to carry out a first discharging operation causing residual electric charge in the capacitor to be consumed within the driving device,
   the control method comprising the steps of:
   controlling the switching elements to carry out a first discharging operation by the discharge circuit in an event of detecting collision of the vehicle by the collision detection unit, and
   controlling the inverter such that a second discharging operation causing current to be applied to the load device to discharge residual electric charge from the capacitor is executed when a voltage of the capacitor exceeds a predetermined threshold value in an event of detecting collision of the vehicle by the collision detection unit.

\* \* \* \* \*